(12) United States Patent
Kubota

(10) Patent No.: US 8,493,477 B2
(45) Date of Patent: Jul. 23, 2013

(54) IMAGE-CAPTURING APPARATUS WITH AUTOMATICALLY ADJUSTABLE ANGLE OF VIEW AND CONTROL METHOD THEREFOR

(75) Inventor: Kouji Kubota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 272 days.

(21) Appl. No.: 12/969,705

(22) Filed: Dec. 16, 2010

(65) Prior Publication Data

US 2011/0149120 A1 Jun. 23, 2011

(30) Foreign Application Priority Data

Dec. 21, 2009 (JP) ................................. 2009-289651

(51) Int. Cl.
*H04N 5/225* (2006.01)
(52) U.S. Cl.
USPC .................................. 348/240.3; 348/240.99
(58) Field of Classification Search
USPC .... 348/143, 169, 240.99–240.3, 211.8–211.9
See application file for complete search history.

(56) References Cited

U.S. PATENT DOCUMENTS

| | | | | |
|---|---|---|---|---|
| 5,812,193 A | * | 9/1998 | Tomitaka et al. | 348/369 |
| 6,055,014 A | * | 4/2000 | Hosonuma et al. | 348/143 |
| 7,483,057 B2 | * | 1/2009 | Grosvenor et al. | 348/211.9 |
| 8,253,847 B2 | * | 8/2012 | Abe | 348/345 |

FOREIGN PATENT DOCUMENTS

JP 09-065197 3/1997

* cited by examiner

*Primary Examiner* — Tuan Ho
(74) *Attorney, Agent, or Firm* — Cowan, Liebowitz & Latman, P.C.

(57) ABSTRACT

The present invention sets an auto-zooming frame that includes a plurality of selected subjects from among subjects detected from a captured image. Then, the angle of view is adjusted so that the entire auto-zooming frame is captured. Auto-zooming frame setting and angle of view adjustment are continuously performed on images that are consecutively captured, thereby providing auto-zooming control for a plurality of subjects.

11 Claims, 5 Drawing Sheets

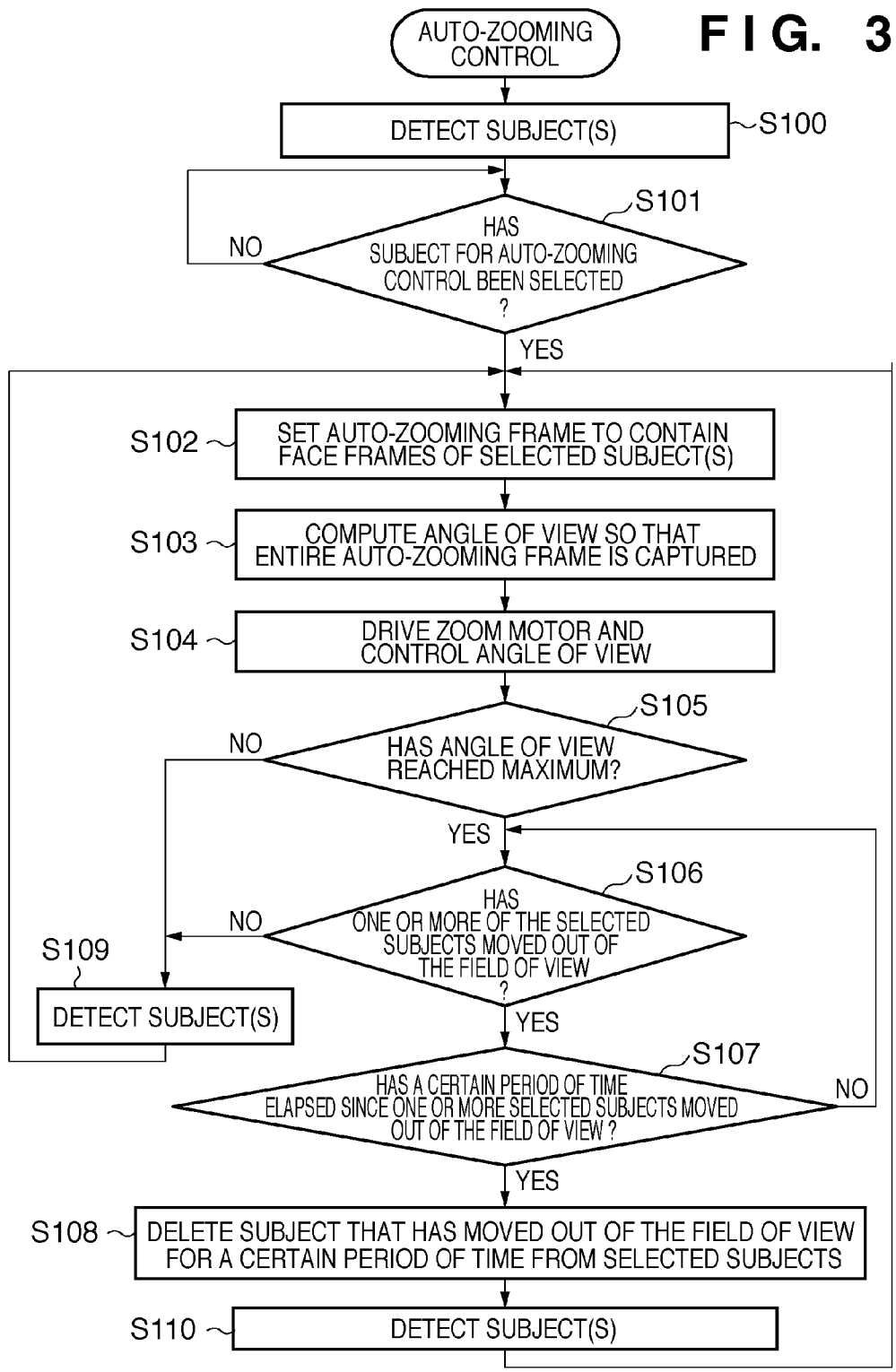

IMAGE-CAPTURING APPARATUS WITH AUTOMATICALLY ADJUSTABLE ANGLE OF VIEW AND CONTROL METHOD THEREFOR

BACKGROUND OF THE INVENTION

1. Field of the Invention

The present invention relates to an image-capturing apparatus and a control method therefor, and more particularly, to an image-capturing apparatus capable of automatically adjusting the angle of view of a zoom lens based on results of detection of a subject, and a control method therefor.

2. Description of the Related Art

Conventionally, a video camera that detects the image of a subject from a field and automatically controls the angle of view of a zoom lens so that that area assumes a predetermined range has been proposed (see Japanese Patent Laid-Open No. 9-65197). The advantage of a video camera that has this type of auto-zooming control capability is that a user can keep the size of the subject in the field substantially constant without adjusting the zoom lens manually.

However, the video camera described in Japanese Patent Laid-Open No. 9-65197 assumes that the subject is one person's face, and as a result neither discloses nor suggests zoom control in a case in which one wishes to capture multiple subjects.

SUMMARY OF THE INVENTION

The present invention provides an image-capturing apparatus capable of auto-zooming control with respect to multiple subjects, and a control method therefor.

According to an aspect of the present invention, there is provided an image-capturing apparatus capable of adjusting an angle of view, comprising: a detection unit that detects a predetermined subject from a captured image; setting unit that sets an area of the captured image as an auto-zooming frame, wherein the area includes a plurality of subjects selected by a user from among the detected subjects; and a control unit that adjusts the angle of view so that the entire area of the auto-zooming frame can be captured, wherein the subject detection, the auto-zooming frame setting, and the angle of view adjustment are continuously performed on a plurality of captured images that are consecutively captured.

According to an aspect of the present invention, there is provided a control method for an image-capturing apparatus capable of adjusting an angle of view, comprising: a detection step of detecting a predetermined subject from a captured image; a setting step of setting an area of the captured image as an auto-zooming frame, wherein the area includes a plurality of subjects selected by a user from among the subjects detected in the detecting step; and a control step of adjusting the angle of view so that the entire area of the auto-zooming frame can be captured, wherein the detection step, the setting step, and the control step are continuously performed on a plurality of captured images that are consecutively captured.

Further features of the present invention will become apparent from the following description of exemplary embodiments with reference to the attached drawings.

BRIEF DESCRIPTION OF THE DRAWINGS

FIG. 3 is a flowchart for explaining the auto-zooming control operation in the first embodiment;

DESCRIPTION OF THE EMBODIMENTS

Exemplary embodiments of the present invention will now be described in detail in accordance with the accompanying drawings.

First Embodiment

Figure 1:
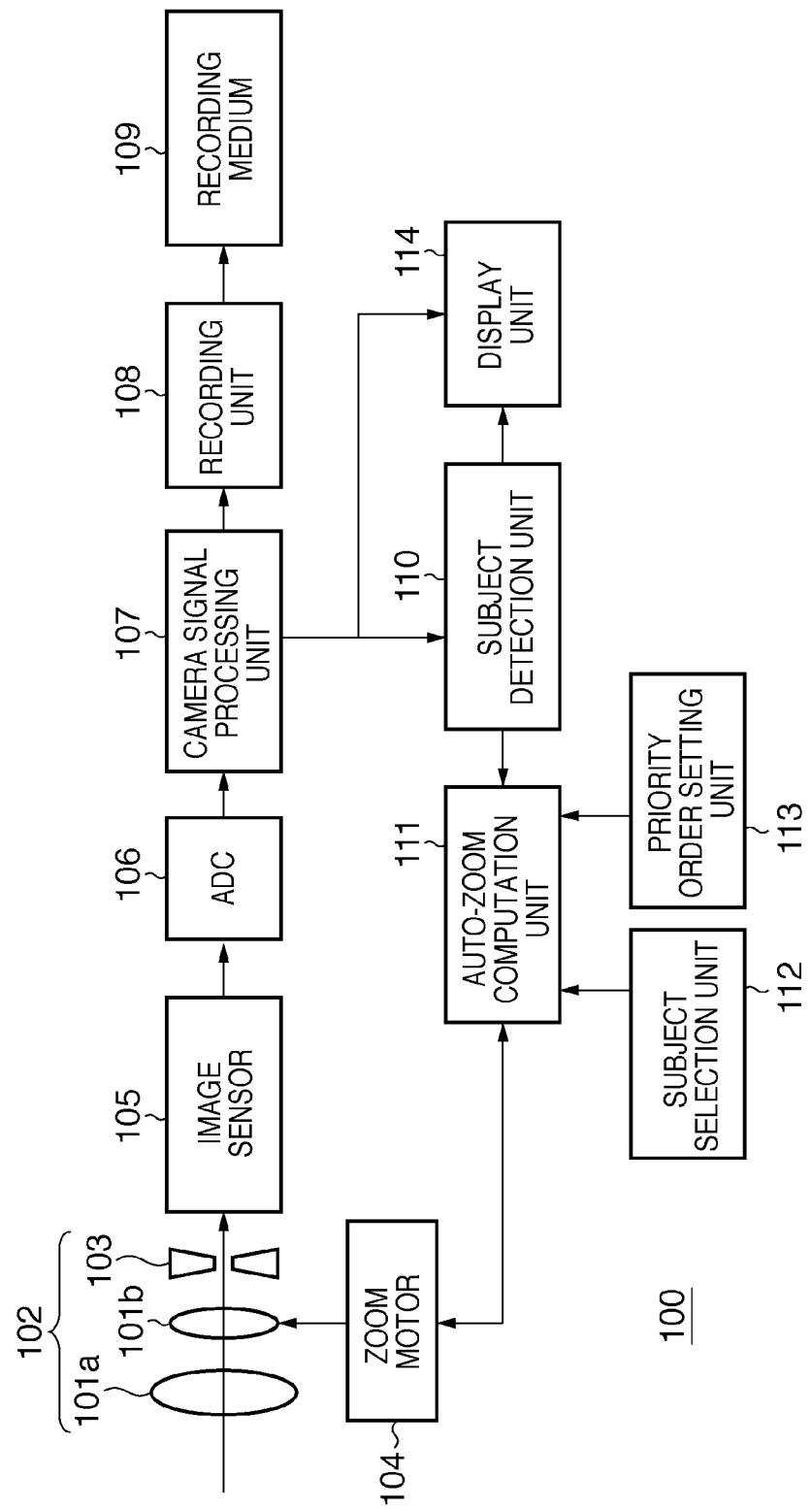
FIG. 1 is a block diagram illustrating a functional configuration example of an image-capturing apparatus according to an embodiment of the present invention.

FIG. 1 is a block diagram illustrating a functional configuration example of an image-capturing apparatus according to an embodiment of the present invention. It is to be noted that the present invention is applicable to any image-capturing apparatus that can detect a subject and change the angle of view (as well as to an apparatus equipped with such an image-capturing apparatus). More specifically, the present invention is applicable though not limited to a digital video camera, digital still camera, and mobile phone equipped with a camera, as well as a mobile information terminal, media player, personal computer, and the like.

In addition, although the following description uses the example of application of the present invention to an image-capturing apparatus equipped with a zoom lens (optical zoom) that can change the angle of view optically, the present invention is also applicable to an image-capturing apparatus that can change the angle of view by image processing (so-called digital zoom).

An image-capturing apparatus 100 has a zoom lens 102 that includes a fixed lens 101a, an angle of view adjustment lens 101b, and an aperture 103. Light rays entering from the fixed lens 101a pass through the angle of view adjustment lens 101b and the aperture 103 and are focused on an image sensor 105. The optical image of the subject formed on the image sensor 105, which is a photoelectric conversion element such as a CCD image sensor or a CMOS image sensor, is converted into an analog image signal in units of pixels. The analog image signal is converted into a digital image signal by an A/D converter (ADC) 106 and is input to a camera signal processing unit 107. The camera signal processing unit 107 subjects the digital image signal to signal processing such as color signal processing, gain control processing, white balance processing, and outputs a video signal. It is to be noted that, in a case in which the video signal is encoded and recorded, the camera signal processing unit 107 also carries out the encoding processing. A recording unit 108 records the video signal output from the camera signal processing unit 107 to a recording medium 109 in a predetermined recording format. The recording medium 109 may be a semiconductor memory, a magnetic recording medium, an optical recording medium or the like, and may either be built into the image-capturing apparatus 100, detachably attachable to the image-capturing apparatus 100, or a combination of both.

From the video signal output from the camera signal processing unit 107, a subject detection unit 110 detects a predetermined subject (for example, a person's face) and outputs the subject position and size as a detection result. Subject detection in the subject detection unit 110 can be implemented on the basis of known technology, and therefore a detailed description thereof is omitted here. Based on the detect results from the subject detection unit 110, an auto-zoom computation unit 111 computes the angle of view of the zoom lens 102. Then, on the basis of the computed result, the auto-zoom computation unit 111 controls a zoom motor 104 and adjusts the angle of view of the zoom lens 102 to the angle of view obtained by computation. A subject selection unit 112 is an operating unit that allows a user to select a plurality of subjects as objects of auto-zoom control. The subject selection unit 112 may, for example, be a touch panel, directional keys, a set key or the like, or any key or switch that enables the user to select an area in a captured image displayed on a display unit 114. The display unit 114 is equipped with an LCD, for example, and displays the captured image from the camera signal processing unit 107 as well as a mark (a frame, etc.) that shows the detected subject based on the detection results from the subject detection unit 110.

It is to be noted that a priority order setting unit 113 is used in a second embodiment that is described later, and is not used in the present embodiment. Therefore, it is not required for the image-capturing apparatus 100 of the present embodiment. However, the priority order setting unit 113, like the subject selection unit 112, allows the user to designate a desired subject from the image displayed on the display unit 114, and in actuality the subject selection unit 112 may also serve as the priority order setting unit 113.

Next, with reference to FIGS. 2A-2D and FIG. 3, a description is given of auto-zooming control in the image-capturing apparatus of the first embodiment. It is to be noted that the auto-zooming control operation can be performed in parallel with other processes (such as auto-focus detection, auto-exposure control, recording, etc.) while the image-capturing apparatus is in image capture standby and during image capture of a moving image. In the following description, a description of these other operations is omitted.

The image-capturing apparatus 100 of the present embodiment makes the display unit 114 function as an electronic viewfinder in image capture standby and during image capture of a moving image. More specifically, the image sensor 105 carries out continuous image capture and an image signal for viewfinder display is output from the camera signal processing unit 107 at a predetermined frame rate (for example, 30 frames/second). Then, by displaying the captured image signal on the LCD of the display unit 114, the display unit 114 functions as an electronic viewfinder. The image signal for viewfinder display has a resolution that matches the display resolution of the display unit 114, and generally consists of fewer pixels than the image signal for recording.

Then, the subject detection unit 110 detects a subject from the image signal for viewfinder display output by the camera signal processing unit 107. If the subject is a person's face, the subject detection unit 110 outputs detection results showing the size and position of an area that is likely to be a person's face (face area) for each detected subject. It is to be noted that, in a case in which the image-capturing apparatus 100 performs auto-zoom control while recording a moving image, the subject detection unit 110 may detect the subject from the images for recording. In addition, it is not necessary to perform subject detection for each frame, and thus subject detection may be performed every several frames. The frequency of subject detection (that is, the trackability of auto-zoom control) can be determined as convenient depending on the processing capability of the subject detection unit 110 and the required auto-zoom trackability.

From the detection results obtained by the subject detection unit 110, the display unit 114 superimposes the mark showing the area detected as the subject in the captured image (a face frame in the present embodiment) on the captured image. Face detection and image-capturing apparatuses having a face frame display capability are well known, and therefore a detailed description thereof is omitted here.

Figure 2A:
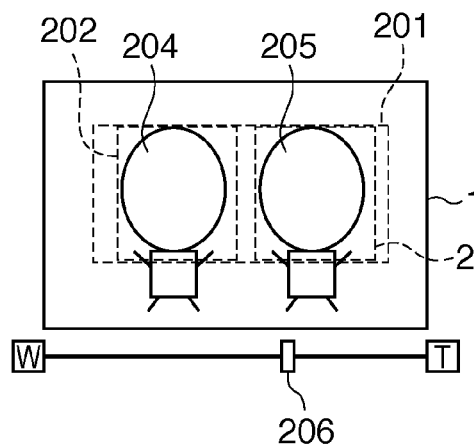
FIGS. 2A-2D are schematic diagrams of auto-zooming control according to a first embodiment.

FIG. 2A shows an example of a state of display of the display unit 114 in a state in which two people are detected as subjects 204, 205. Face frames 202, 203 indicating detected subjects are superimposed on the faces of the persons 204, 205 (S100). It is to be noted that, in the bottom part of FIG. 2A, the current angle of view of the zoom lens 102 is shown together with the adjustable range of the angle of view of the zoom lens 102. Schematically, W represents the wide-angle end (maximum angle of view), T represents the telephoto end (minimum angle of view), and reference numeral 206 represents the current angle of view, respectively.

Using the keys or buttons included in the subject selection unit 112 for inputting a subject selection start instruction, for example, the user can perform subject selection (S101). For example, if the subject selection unit 112 has a touch panel that allows designation of any set of coordinates on the image in the display unit 114, the user can perform subject selection by designating the position in the face frame that corresponds to the subject that he or she wishes to make the object of auto-zoom control using the touch panel. Alternatively, the user can also perform subject selection using the direction keys of the subject selection unit 112 to select the face frame corresponding to the desired subject and pressing the set key. The exact method of selecting the subject from the display image is not an essential part of the present invention, and any known technique can be employed.

Here, if the user has successively designated the face frames 202, 203 of the subjects 204 and 205, the designation results information (for example, information on the coordinates on the image or the designated face frames) is then sent form the subject selection unit 112 to the auto-zoom computation unit 111. From the designation results information and the subject detection unit 110 detection results, the auto-zoom computation unit 111 then sets a rectangular frame containing the subject 204 face detection frame 202 and the subject 205 face detection frame 203 as an auto-zooming frame 201 (S102). The auto-zooming frame 201 can be set as the smallest rectangle that circumscribes the plurality of face detection frames. However, taking into account face area detection error, the auto-zooming frame 201 is given a small margin on both sides that can prevent a portion of the faces of the subjects selected from getting cut off at the edges of the screen during auto-zoom control. In addition, as an aesthetic matter, it is more likely that the viewer prefers to leave some space at the sides rather than have the subjects fill the screen to the very edge. For the same reasons, the auto-zooming frame 201 can also be set so as to leave a slight margin at the top and bottom as well.

The auto-zoom computation unit 111 computes the angle of view (zooming position) that fits the entire set auto-zooming frame 201 within the screen (S103). This computation may be carried out from the relation between the amount of change in the zooming position (angle of view) and the rate of enlargement/reduction of the image, or it may be carried out by referencing a table in which this relation is stored in advance. In addition, the angle of view may be computed in such a way that the entire auto-zooming frame 201 is captured at an appropriate size (for example, as large as possible). The appropriate size for the auto-zooming frame 201 can be determined in advance as a proportion (for example, 80% or more, etc.) of the long side of the auto-zooming frame 201 to the size of the corresponding side of the screen (the size of the length or the width).

Then, the auto-zoom computation unit 111 drives the zoom motor 104 to the zooming position (angle of view) obtained by computation (S104). The auto-zoom computation unit 111 identifies whether or not the angle of view after the change has reached a maximum changeable value (S105). Here, in a case in which the angle of view after the change has not reached the maximum changeable value, then based on the results of the subject detection of the next image that is captured (S109), processing from S102 is continuously performed. As described above, auto-zooming control need not be performed continuously for each frame of a continuously captured image. When carrying out auto-zooming control every several frames, the apparatus stands by for the start of subject detection until the next image to be processed is captured.

Figure 2B:
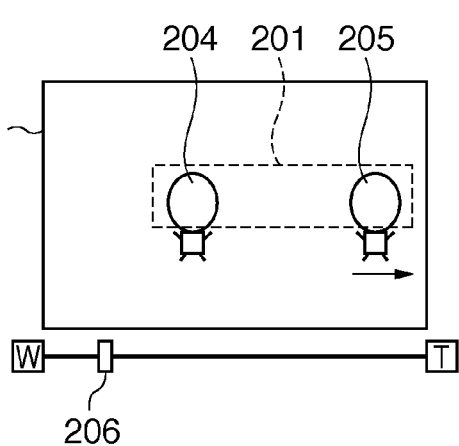

By repeatedly performing the auto-zooming control described above, then, for example, if the subject 204 does to move from the state shown in FIG. 2A but the subject 205 moves way from the subject 204 to the right, the width of the auto-zooming frame 201 that the auto-zoom computation unit 111 sets increases. As a result, the angle of view of the zoom lens 102 is made larger (moves to the wide-angle side) (FIG. 2B). If the distance between the subjects 205 and 204 becomes shorter, the width of the auto-zooming frame 201 decreases and the auto-zoom computation unit 111 makes the angle of view of the zoom lens 102 smaller (moves to the telephoto-side). If the subject 205 moves even farther to the right from the state shown in FIG. 2B, the angle of view of the zoom lens 102 reaches its maximum (Yes in S105). Then, in a case in which the subject 205 continues to move away from the center of the image to the right, and the subject 205 moves outside the field of view and is no longer detected by the subject detection unit 110, it becomes impossible to set an auto-zooming frame 201 that includes the subject 205 within the screen (Yes in S106).

Figure 2C:
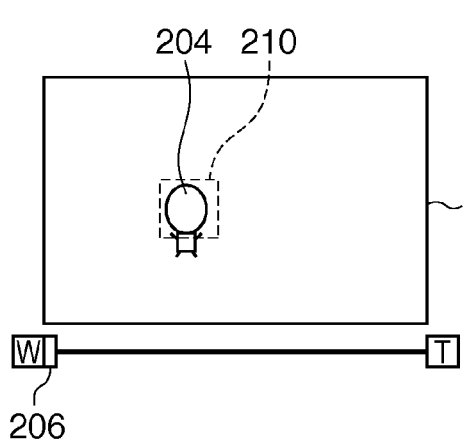
Figure 2D:
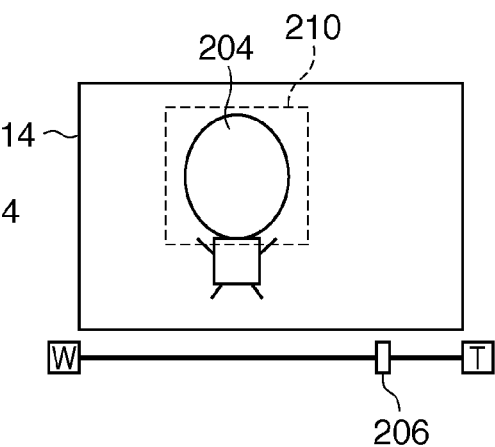

When the zoom lens 102 is at its maximum angle of view and the subject detection unit 110 becomes unable to detect either of the subjects that should be included in the auto-zooming frame 201, the auto-zoom computation unit 111 starts to count the elapsed time (S107), and deletes from the selected subjects that should be included in the auto-zooming frame 201 any subject that cannot be detected after a pre-set period of time has elapsed (S108). The auto-zoom computation unit 111, as shown in FIG. 2C, based on the results of subject detection for the next image that is captured (S110), sets a new auto-zooming frame 201 that includes the face frames of the selected subjects other than the subject that was deleted in S108 (S102). With this, auto-zooming control is continued based on the new auto-zooming frame 201 (FIG. 2D).

As described above, the present embodiment makes it possible to carry out appropriate auto-zooming control for a plurality of subjects by setting an auto-zooming frame that includes a plurality of subject areas and automatically adjusting the angle of view so that the auto-zooming frame reaches a predetermined size with respect to the screen. In addition, in a case in which one of the plurality of subject areas that should be included in the auto-zooming frame can no longer be detected after a predetermined period of time has elapsed, a new auto-zooming frame is set for subject areas other than that subject area as auto-zooming control is continued. As a result, is becomes possible to carry out appropriate auto-zooming control for subject(s) that are actually being captured.

Second Embodiment

Next, a description is given of a second embodiment of the present invention. The image-capturing apparatus according to the present embodiment differs from that of the first embodiment in that a priority order setting unit 113 is used in place of the subject selection unit 112 of the structure shown in FIG. 1.

Accordingly, in the image-capturing apparatus 100 of the present embodiment the subject selection unit 112 is not necessary. However, as described above, because the priority order setting unit 113 and the subject selection unit 112 are configured to allow the user to designate a desired subject from the image being displayed on the display unit 114, in actuality the priority order setting unit 113 may also serve as the subject selection unit 112.

The first embodiment described above treats all the plurality of selected subjects the same. As a result, for example, in a case in which a primary subject that the user wishes to capture first is the subject 204 and the subject 205 is a subsidiary subject, there is a possibility that movement of the subsidiary subject might cause the primary subject to assume a size not desired by the user. Specifically, if the long side of the auto-zooming frame 201 expands as the subsidiary subject 205 moves away from the primary subject 204 in length as shown in FIG. 2B, then since the angle of view is automatically adjusted so as to grow larger the size of the primary subject 204 in the screen grows smaller. The auto-zooming control of the first embodiment does not take into consideration a decrease in the size of the primary subject 204 and consequently there is a possibility that the primary subject 204 is captured at a size that the user does not desire (i.e., smaller than desired).

By contrast, in the present embodiment, the priority order setting unit 113 enables the user to designate the priority order of individual subjects when selecting the subjects that are to be subjected to auto-zooming control. Then, the auto-zoom computation unit 111 performs auto-zooming control while keeping the primary subject at a predetermined size so as to be captured.

Next, with reference to FIGS. 4A-4D and FIG. 5, a description is given of the auto-zooming control operation in the image-capturing apparatus of the present embodiment. It is to be noted that in FIGS. 4A-4D and FIG. 5 structures and processes that are the same as those of the first embodiment shown in FIGS. 2A-2D and FIG. 3 are given the same reference numerals and descriptions thereof are omitted.

Figure 4A:
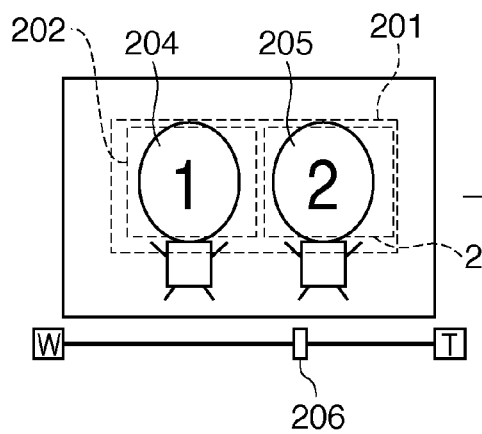
FIGS. 4A-4D are schematic diagrams of auto-zooming control according to a second embodiment.
Figure 4B:
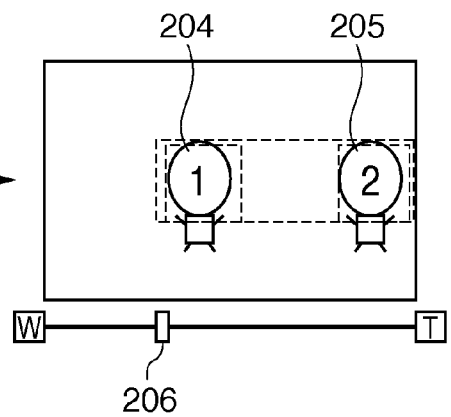
Figure 4C:
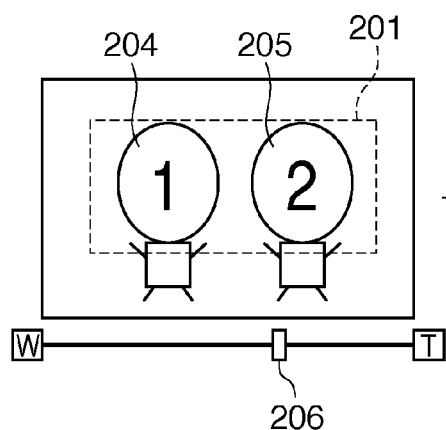
Figure 4D:
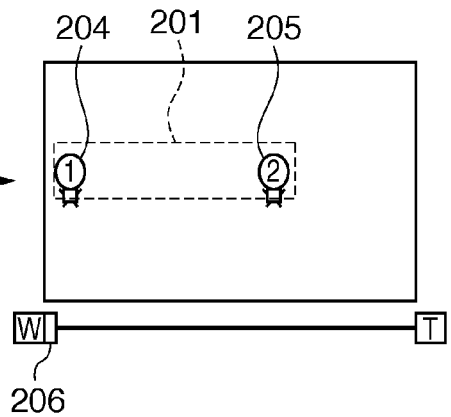
Figure 5:
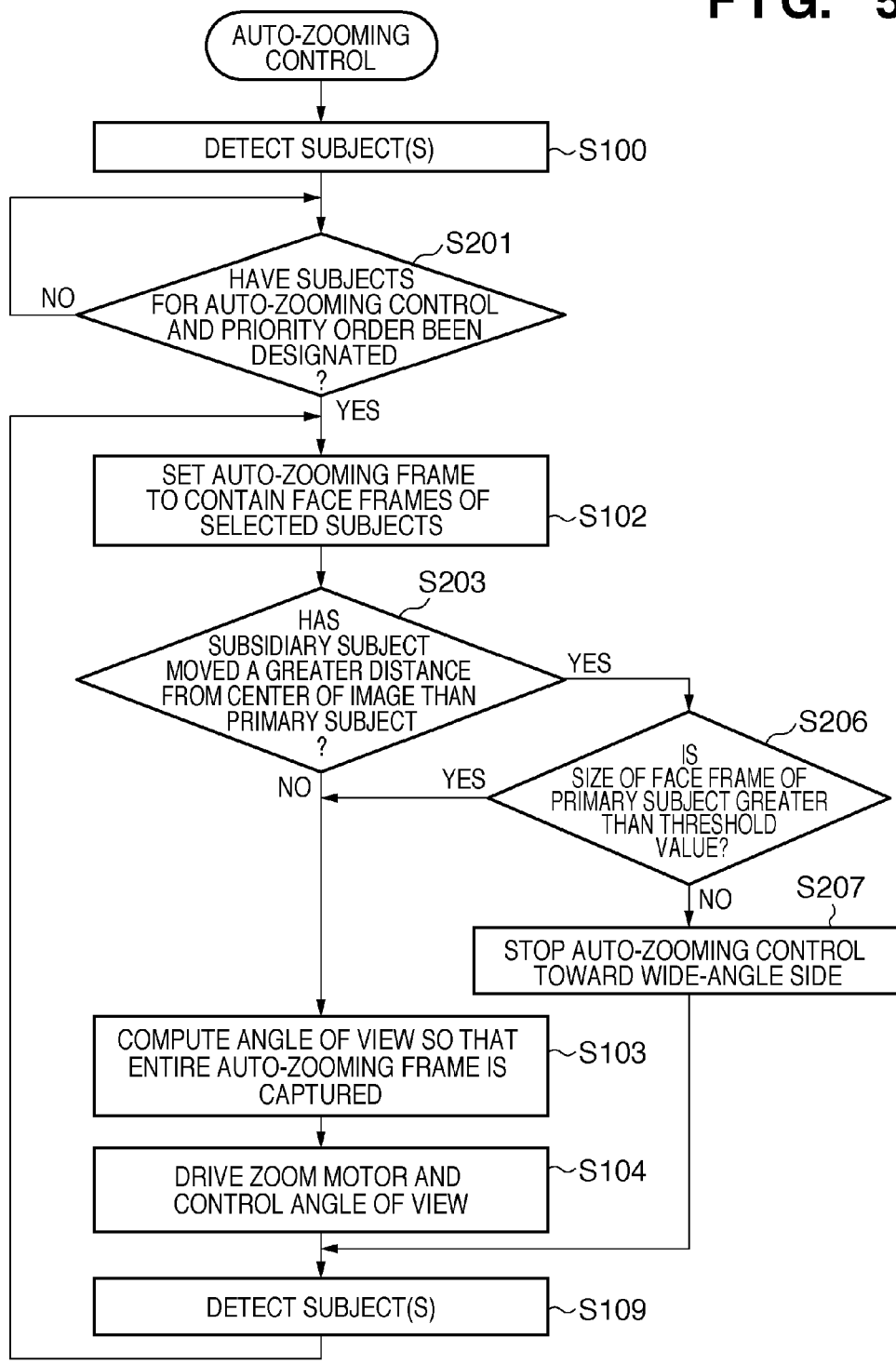
FIG. 5 is a flowchart for explaining the auto-zooming control operation in the second embodiment.

Like FIG. 2A, FIG. 4A shows an example of the display unit 114 displaying a state in which two persons 204, 205 are detected as subjects (S100).

Here, for example, the user can carry out priority order designation using the keys or buttons, etc. for the purpose of inputting an instruction to start subject selection that are contained in the priority order setting unit 113. For example, assume that the priority order setting unit 113 has a touch panel that enables designation of any set of coordinates on the screen of the display unit 114. In this case, the user can carry out subject selection and priority order designation using the touch panel to designate positions in the face frames that correspond to the subjects that the user wishes to make targets of auto-zooming control in priority order starting from the highest priority. Alternatively, the user can carry out subject selection using the direction keys of the priority order setting unit 113 to select the face frames that correspond to the desired subjects and pressing the set key in priority order starting from the subject with the highest priority.

It is to be noted that although the description given here uses as an example the simultaneous carrying out of subject selection and priority order designation, it is also possible to carry out subject selection and priority order designation independently. Moreover, it is not necessary that the subject priority order be different for each and every selected subject, and thus it is also possible to designate only the subject with the highest priority order (the primary subject) among the plurality of selected subjects and treat the priority order of all the other subjects the same. In that case, once selection of the subjects that are to be the targets of auto-zooming control is completed, the user can then designate the primary subject from among the selected subjects. In addition, of the selected subjects, the subject closest to the center of the image may be set automatically as the primary subject and the other subjects treated as the subsidiary subjects. In that case, it is not necessary for the user to designate the priority order of the subjects. It is to be noted that both subject selection and priority order designation are operations that designate subjects. As such they are not an essential part of the present invention, and any known technique can be employed.

Here, the subject 204 and the subject 205 are selected as subjects for auto-zooming control, with the subject 204 being first in priority order (the primary subject) and the subject 205 being second in priority order (the secondary subject) (S201). The information on the designation results (for example, coordinates on the image or information on a designated face flame) and the information on the priority order are sent from the priority order setting unit 113 to the auto-zoom computation unit 111. From the information on the designation results and the detection results obtained by the subject detection unit 110, the auto-zoom computation unit 111 sets a rectangle that contains the face frame 202 of the subject 204 and the face frame 203 of the subject 205 as the auto-zooming frame 201 (S102).

In S203, the auto-zoom computation unit 111 detects the moving distance from the center of the image of the primary subject 204 and the subsidiary subject 205 from the preceding processing point in time. The auto-zoom computation unit 111 stores in memory the most recent positions of the face frames of the primary subject 204 and the subsidiary subject 205, and can detect the moving distance of the subjects by obtaining the difference between the most recent positions stored in memory and the current positions of the face frames obtained from the subject detection unit 110.

If the moving distance of the primary subject 204 is equal to or greater than the moving distance of the subsidiary subject 205 (No in S203), then in S103 the auto-zoom computation unit 111 computes the zooming position as in the first embodiment, and in S104 drives the zoom motor 104 and automatically controls the zoom position (angle of view). This control is shown schematically in FIG. 4C and FIG. 4D.

On the other hand, if the moving distance of the subsidiary subject 205 is greater (Yes in S203), the auto-zoom computation unit 111 computes the size of the face frame of the primary subject in a case in which auto-zooming control is carried out and determines whether or not it is greater than a threshold value (S206). If the face frame size so computed is greater than the threshold value, the auto-zoom computation unit 111 implements auto-zooming using the newest face frame set in S102 (S103, S104). However, in a case in which the size of the face frame of the primary subject 204 is equal to or less than the threshold value, the auto-zoom computation unit 111 halts auto-zooming (toward the wide-angle side) and keeps the current angle of view. For example, if the subsidiary subject 205 has moved to the right from the state shown in FIG. 4A and then has moved farther to the right in the state shown in FIG. 4B, and if the primary subject face frame size is determined to be at or below the threshold value, the auto-zoom computation unit 111 stops auto-zooming control to the wide-angle side from the state shown in FIG. 4B and keeps the angle of view (does not change). If the subsidiary subject 205 were to move farther still, then although there is a possibility that at least a portion of the subsidiary subject 205 will not be captured the size of the primary subject 204 is given priority.

As described above, auto-zooming control for a plurality of subjects is possible with the present embodiment as well. In particular, the present embodiment assigns a priority order to the plurality of subjects on which auto-zooming control is to be conducted, and carries out auto-zooming control in a range such that the size of the higher priority order subject does equal or fall below a threshold value range. As a result, the present embodiment is able to prevent the size of the higher priority order subject does not become too small due to movement of a lower priority order subject.

Other Embodiments

Although the present invention has been described above based on exemplary embodiments thereof, the present invention is not limited to specific embodiments and encompasses within its scope a variety of variations and modifications. Moreover, the above-described embodiments may be combined as convenient in part or in whole. Specifically, in the second embodiment as well, as with the first embodiment, a subsidiary subject that has moved outside the field of view may be removed as a target of auto-zooming. For example, in S207, in a state in which auto-zooming control toward the wide-angle side is stopped and the subject 205 has moved outside the screen, the auto-zooming frame can be reset so as to exclude the subsidiary subject 205.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-289651, filed on Dec. 21, 2009, which is hereby incorporated by reference herein its entirety.

What is claimed is:

1. An image-capturing apparatus capable of adjusting an angle of view, comprising:
a detection unit that detects a predetermined subject from a captured image;
a setting unit that sets an area of the captured image as an auto-zooming frame, wherein the area includes a plurality of subjects selected from among the detected subjects, wherein, in a case in which at least one of the plurality of subjects moves out of a field of view that is larger than the auto-zooming frame, the setting unit sets the auto-zooming frame on a subject other than the subject that has moved out of the field of view; and
a control unit that adjusts the angle of view so the auto-zooming frame can be captured.

2. An image-capturing apparatus capable of adjusting an angle of view, comprising:
- a detection unit that detects a predetermined subject from a captured image;
- a setting unit that sets an area of the captured image as an auto-zooming frame, wherein the area includes a plurality of subjects selected from among the detected subjects; and
- a control unit that adjusts the angle of view so that the auto-zooming frame can be captured, wherein the control unit changes the angle of view in a range in which a size of an image relating to a designated subject designated from among the plurality of subjects does not equal or fall below a predetermined threshold value.

3. The image-capturing apparatus according to claim 2, further comprising a designating unit that designates one subject closest to a center of the captured image out of the plurality of subjects as the designated subject.

4. A control method for an image-capturing apparatus capable of adjusting an angle of view, comprising:
- a detection step of detecting a predetermined subject from a captured image;
- a setting step of setting an area of the captured image as an auto-zooming frame, wherein the area includes a plurality of subjects selected from among the subjects detected in the detecting step, wherein, in a case in which at least one of the plurality of subjects moves out of a field of view which is larger than the auto-zooming frame, the setting step sets the auto-zooming frame on a subject other than the subject that has moved out of the field of view; and
- a control step of adjusting the angle of view so that the auto-zooming frame can be captured.

5. The image-capturing apparatus according to claim 1, wherein the setting unit sets an area including a plurality of subjects selected by a user from among the detected subjects as the auto-zooming frame.

6. The image-capturing apparatus according to claim 1, wherein the subject detection, the auto-zooming frame setting, and the angle of view adjustment are continuously performed on a plurality of captured images that are consecutively captured.

7. The image-capturing apparatus according to claim 1, wherein, in a case in which at least one of the plurality of subjects moves out of a field of view of the image-capturing apparatus of which the angle of view is at maximum, the setting unit sets the auto-zooming frame on a subject other than the subject that has moved out of the field of view.

8. The image-capturing apparatus according to claim 2, wherein the setting unit sets an area including a plurality of subjects selected by a user from among the detected subjects as the auto-zooming frame.

9. The image-capturing apparatus according to claim 2, wherein the subject detection, the auto-zooming frame setting, and the angle of view adjustment are continuously performed on a plurality of captured images that are consecutively captured.

10. The image-capturing apparatus according to claim 2, wherein, in a case in which at least one of the plurality of subjects moves out of a field of view of the image-capturing apparatus of which the angle of view is at maximum, the setting unit sets the auto-zooming frame on a subject other than the subject that has moved out of the field of view.

11. A control method for an image-capturing apparatus capable of adjusting an angle of view, comprising:
- a detection step of detecting a predetermined subject from a captured image;
- a setting step of setting an area of the captured image as an auto-zooming frame, wherein the area includes a plurality of subjects selected from among the subjects detected in the detecting step; and
- a control step of adjusting the angle of view so that the auto-zooming frame can be captured, wherein the control step changes the angle of view in a range in which a size of an image relating to a designated subject designated from among the plurality of subjects does not equal or fall below a predetermined threshold value.

* * * * *